United States Patent
Smith et al.

[19]

[11] Patent Number: 6,132,323

[45] Date of Patent: Oct. 17, 2000

[54] THERMOPLASTIC/THERMOSET HYBRID GOLF CLUB SHAFTS AND METHODS OF MANUFACTURING THE SAME

[75] Inventors: Brian S. Smith, San Diego; Herbert Reyes, Laguna Niguel; James M. Murphy, Oceanside, all of Calif.

[73] Assignee: Callaway Golf Company, Carlsbad, Calif.

[21] Appl. No.: 09/221,208

[22] Filed: Dec. 22, 1998

[51] Int. Cl.⁷ .................................................. A63B 53/10
[52] U.S. Cl. ...................................... 473/319; 273/DIG. 7
[58] Field of Search .................................. 473/316–323; 273/DIG. 7; 428/36.3, 36.9; 264/635; 156/187–188

[56] References Cited

U.S. PATENT DOCUMENTS

| | | |
|---|---|---|
| Re. 29,375 | 8/1977 | Thiele . |
| 4,070,019 | 1/1978 | Segal et al. . |
| 4,604,319 | 8/1986 | Evans ........................................ 428/113 |
| 5,083,780 | 1/1992 | Walton ...................................... 473/320 |
| 5,279,879 | 1/1994 | Takezawa et al. . |
| 5,310,516 | 5/1994 | Shen . |
| 5,318,742 | 6/1994 | You . |
| 5,348,777 | 9/1994 | Oonuki et al. . |
| 5,397,636 | 3/1995 | Miyao et al. . |
| 5,409,651 | 4/1995 | Head . |
| 5,549,947 | 8/1996 | Quigley ................................... 428/36.2 |
| 5,575,875 | 11/1996 | Brittingham et al. . |
| 5,634,861 | 6/1997 | Yamamoto ............................... 473/319 |
| 5,692,970 | 12/1997 | Nelson ..................................... 473/318 |
| 5,882,268 | 3/1999 | McIntosh ................................. 473/316 |

FOREIGN PATENT DOCUMENTS 2306335  7/1997  United Kingdom .

*Primary Examiner*—Jeanette Chapman
*Assistant Examiner*—Stephen L. Blau
*Attorney, Agent, or Firm*—Michael A. Catania; Lyon & Lyon LLP

[57] ABSTRACT

An improved shaft for a golf club and methods of manufacturing the same. A plurality of layers of composite fiber bound within a thermoset resin are bonded to one or more layers of composite fiber bound within a thermoplastic resin using a high peel strength nylon epoxy adhesive. Preferably, the layer(s) of composite fiber bound within the thermoplastic resin comprise the outermost layer of a golf club shaft.

In one preferred form, a plurality of plies of pre-preg composite sheet including a thermoset resin are wrapped around a mandrel and pre-cured. Thereafter, a layer of adhesive is wrapped over the pre-cured plies, at least one ply of pre-preg composite sheet including a thermoplastic resin is wrapped over the adhesive, and a cellophane or polypropylene tape is wrapped over the outermost layer of pre-preg. Thereafter, the ply wrapped mandrel is placed in a mold and heated to a predetermined temperature for a time sufficient to allow curing of all of the plies comprising the golf club shaft.

In an alternative form, the layer of fiber comprising the thermoplastic resin may be pre-cured and used as a shell during the curing process. Bladder molding is preferred in such embodiments.

10 Claims, 1 Drawing Sheet

THERMOPLASTIC/THERMOSET HYBRID GOLF CLUB SHAFTS AND METHODS OF MANUFACTURING THE SAME

BACKGROUND

The present invention relates generally to golf clubs and, more particularly, to hybrid composite golf club shafts and methods of manufacturing the same.

With the advent of composite golf club shafts, it has become much easier to tailor the design of a golf club to the needs of a particular player or particular shot. For example, for longer shots and lower numbered irons, or woods, it is often desirable to use a more flexible shaft. Whereas, for shorter shots and higher numbered irons, it is often more desirable to use a stiffer shaft. Such design goals may be achieved, for example, through the use of additional layers of composite fiber in shorter shafted clubs and through the use of fewer layers of fiber in longer clubs. Such design goals may also be achieved by varying the orientation of the layers of composite fiber that make up a shaft. For example, to add stiffness to a club shaft it may be desirable to utilize several layers of composite fiber that run parallel to the longitudinal axis of the shaft, whereas to enhance the flexibility of a shaft it may be desirable to utilize several layers of composite fiber which are offset to a substantial degree, for example, +/−45° or more, from the longitudinal axis.

With regard to the manufacture of composite golf club shafts, those skilled in the art will appreciate that each layer of composite fiber may be formed using a "pre-preg" composite sheet, and that pre-preg composite sheets may be manufactured by pulling strands of fiber, for example, carbon or glass fiber, through a resin solution and allowing the resin to partially cure. Exemplary resins or "binding matrices" may include, for example, thermoset epoxy resins and thermoplastic resins. Alternatively, pre-preg sheets may be manufactured by pulling a fabric or weave of composite fabric through a resin solution and allowing the resin to partially cure. In either case, once the resin is partially cured or "staged," the resin holds the fibers together such that the fibers form a malleable sheet.

It also will be appreciated that the performance characteristics of a golf club shaft may be significantly altered through the choice of resin or binding matrix used within the shaft. For example, it will be appreciated that composite materials bound within a thermoset binding matrix may be used to produce stiffer shafts, whereas similar composite materials bound within a thermoplastic resin may produce a softer feeling shaft. Further, it will be noted that shafts manufactured from thermoset materials are generally harder and more brittle than shafts manufactured from thermoplastic materials, and that thermoplastic materials provide a greater amount of vibration damping than do thermoset materials when used within a golf club shaft. Those skilled in the art also will appreciate that better impact tolerance characteristics may be achieved through the use of thermoplastic materials as opposed to thermoset materials.

Prior to this time, however, those skilled in the art have encountered substantial difficulty in developing a hybrid golf club shaft that provides the benefits associated with both thermoplastic and thermoset resin pre-pregs. One reason for this is that, prior to the conception of the subject invention, difficulty was encountered in providing a durable bond between the layers of thermoplastic and thermoset resin within a golf club shaft. Moreover, when attempts were made to produce a hybrid thermoplastic/thermoset golf club shaft, substantial issues of durability were encountered as a result of sheering between the respective layers. Stated somewhat differently, when attempts were made to produce hybrid thermoplastic/thermoset golf club shafts using conventional methodologies, the resulting shafts were not able to pass standard durability requirements. For example, when fitted with club heads and swung by a mechanical ball-hitting machine, the shafts were unable to withstand 550 high heel hits without incurring substantial delamination of the resin layers comprising the shafts.

In view of the foregoing, it is submitted that those skilled in the art would find an improved hybrid thermoplastic/thermoset composite golf club shaft capable of passing rigorous durability testing, and methods of manufacturing such shafts, to be quite useful.

SUMMARY OF THE INVENTION

The present invention is directed to methods of manufacturing thermoplastic/thermoset hybrid golf club shafts and to shafts manufactured in accordance with such methods.

In one particularly innovative aspect, the present invention is directed to a golf club shaft comprising one or more plies or layers of composite fiber bound within a thermoset resin and at least one ply or layer of composite fiber bound within a thermoplastic resin, wherein the layer of fiber bound within the thermoplastic resin is bonded via a co-curing process to a layer of fiber bound within the thermoset resin by a high peel strength nylon epoxy film adhesive. It is believed that, by virtue of the use of the high peel strength nylon epoxy film adhesive within golf club shafts in accordance with the present invention, those shafts are able to better endure conventional durability testing procedures and, indeed, that those shafts are able to endure even the most rugged durability testing procedures. Moreover, it is believed that the high peel strength nylon epoxy adhesive film creates a durable bond between the dissimilar pre-preg materials. Thus, the adhesive layer is composed of a material that is different than the materials of the prepreg layers, and the composition of the adhesive layer is homogeneous throughout the entire adhesive layer.

Thus, it will be appreciated by those skilled in the art that a shaft manufactured in accordance with the present invention may be quite durable while exhibiting the preferred characteristics of both thermoplastic and thermoset products. For example, it will be appreciated that because fibers bound within a thermoset resin may comprise the core of a shaft in accordance with the present invention, such shafts may exhibit the same torsional performance characteristics as conventional shafts. Further, through the utilization of one or more layers of fiber bound within a thermoplastic resin around the periphery of the shafts, shafts made in accordance with the present invention may exhibit improved damage resistance characteristics and, perhaps of equal importance, will provide a softer feel due to the vibration damping characteristics of the thermoplastic resin.

Those skilled in the art also will appreciate that the subject invention has applicability to both filament winding and pre-preg layering processes.

For example, to manufacture a golf club shaft in accordance with the present invention using a pre-preg wrapping process, the following steps are preferably followed. The dimensions and relative positions of the plies of thermoset pre-preg and thermoplastic pre-preg composite fiber sheet are determined, and a set of plies to be used in the shaft is prepared.

A ply of bonding adhesive, preferably comprising a high peel strength nylon epoxy film adhesive, is also prepared.

The plies of thermoplastic pre-preg are then wrapped around a mandrel in a predetermined manner and shrink-wrapped and cured according to a prescribed curing cycle. Thereafter, the shrink-wrap is removed and a ply of adhesive is wrapped over the pre-cured thermoplastic plies. Then, one or more plies of thermoset pre-preg are wrapped over the adhesive. The entire assembly may then be shrink-wrapped and cured. Following the curing process, the shrink-wrap is removed from the assembly, and the outer layer of the shaft is sanded and finished to specifications.

In an alternative embodiment, a bladder molding process may be used. In such a process, a mandrel having predefined dimensions is selected and covered by a bladder manufactured, for example, from silicone. Plies of thermoplastic pre-preg are then wound around the bladder-covered mandrel in a predetermined manner, placed in a mold, and pre-cured. The mandrel and bladder then are removed from the pre-cured part. Thereafter, a second bladder-covered mandrel is prepared, one or more plies of thermoset pre-preg are wrapped around the second bladder-covered mandrel, and a ply of adhesive is wrapped over the plies of thermoset prepreg. The thermoset and adhesive wrapped mandrel is then inserted into a cavity formed within the pre-cured thermoplastic part, and the entire assembly is placed in a mold. A source of pressurized gas may then be used to inflate the bladder and force the plies of thermoset pre-preg against an inner wall of the pre-cured thermoplastic part, and the mold may be placed in an oven for a selected period of time, i.e., a time sufficient to allow proper curing of the resin comprising the various thermoset and thermoplastic plies. Thereafter, the second mandrel and bladder may be removed from the core of the shaft, and the shaft itself may be removed from the mold.

In one alternative embodiment, the plies including a thermoplastic resin may be wrapped around the mandrel and pre-cured in a mold using a bladder process and/or a shrink-wrap process. After the pre-cure, the adhesive and ply (or plies) including the thermoset resin may be wrapped over the pre-cured layers of thermoplastic pre-preg. Following that, a cellophane or polypropylene tape may be wrapped over the layer(s) of pre-preg including the thermoset resin, and the pre-preg wrapped mandrel assembly may be placed within a mold. The part may then be heated to a predetermined temperature for a time sufficient to allow the layers of pre-preg and adhesive to fully cure.

Those skilled in the art will recognize, of course, that numerous other methods may be employed to manufacture golf club shafts in accordance with the present invention and that the above-described methods are but examples of those methods. For example, in alternative embodiments a filament winding process may be used to wrap the layers of fiber over the mandrel and any intervening plies. However, in such embodiments it is preferable to apply a ply of adhesive between any fiber layers that are bound within differing binding matrices (i.e., thermoset and thermoplastic matrices).

Accordingly, it is an object of the present invention to provide an improved shaft for a golf club and to provide improved methods of manufacturing the same.

It is also an object of the present invention to provide a thermoset/thermoplastic hybrid golf club shaft and to provide improved methods for manufacturing the same.

DESCRIPTION OF PREFERRED EMBODIMENTS

Figure 1A:
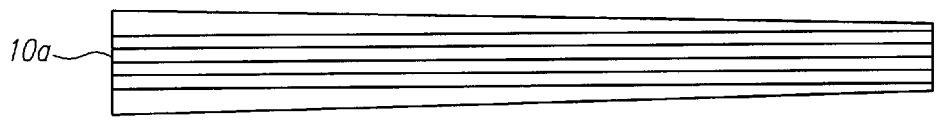
FIG. 1 provides an illustration of a set of plies of pre-preg carbon fiber sheet and adhesive that may be used to manufacture a golf club shaft in accordance with one preferred form of the present invention.
Figure 1B:
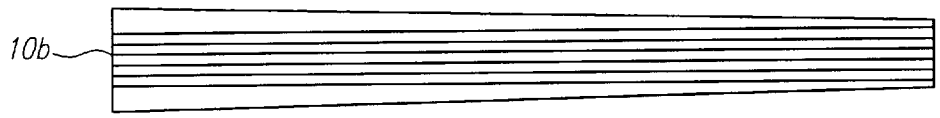
Figure 1C:
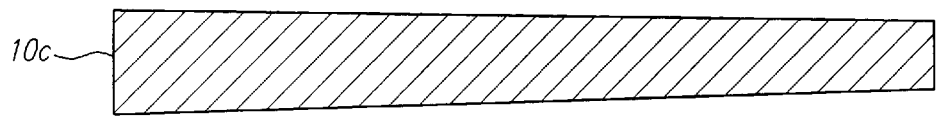
Figure 1D:
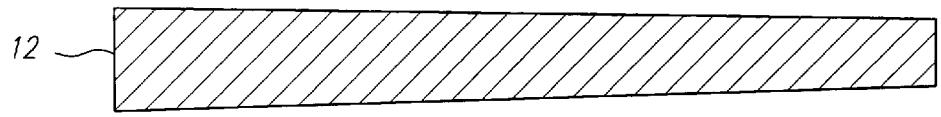

Turning now to the drawings, FIG. 1 provides an illustration of a set of plies of pre-preg carbon fiber sheet 10 and adhesive 12 that may be used to manufacture a golf club shaft in accordance with a preferred form of the present invention. As shown, pre-preg plies 10a and 10b comprise carbon fiber bound within a thermoplastic resin, and pre-preg ply 10c comprises carbon fiber bound within a thermoset. Those skilled in the art will appreciate that in alternative forms different composite materials, such as glass fiber, might be used, and that the use of such materials would be an equivalent substitution of components.

In the embodiments described herein and shown, for example, in FIG. 1, the ply/plies of pre-preg including the thermoset resin is/are preferably oriented at +/−45°, and the ply/plies of pre-preg including the thermoplastic resin is/are oriented at 0°. However, those skilled in the art will appreciate that, depending upon the design characteristics desired for a particular shaft, additional layers of fiber or pre-preg may be utilized, and the orientation of the layers of fiber or pre-preg may be varied.

As explained above, the pre-preg carbon fiber sheets comprising plies 10a–c may be manufactured by pulling strands of carbon fiber, or a fabric or weave of carbon fiber, through a resin solution and allowing the resin to partially cure. Moreover, when the resin is partially cured, the resin holds the fibers together such that the fibers form a malleable sheet. Exemplary pre-preg carbon fiber sheets including a thermoset resin may be obtained from Fiberite of Greenville, Tex., or Hexcel of Pleasanton, Calif., and exemplary pre-preg fiber sheets including a thermoplastic resin may be obtained from Cytec of Anaheim, Calif.

The adhesive from which ply 12 is formed preferably comprises a high peel strength nylon epoxy film adhesive, and may be obtained from Cytec of Anaheim, Calif. Presently, Cytec FM 1000 and FM 1080 adhesives are preferred.

Figure 2:
FIG. 2 is an illustration of a mandrel that may be used when manufacturing a golf club shaft using the plies illustrated in FIG. 1.

The steps that may be followed in manufacturing a golf club shaft in accordance with the present invention may proceed, for example, as follows. The dimensions and relative positions of the plies of pre-preg carbon fiber 10 and adhesive 12 are determined, and a set of plies 10a–c and 12 to be used within the shaft is prepared. A mandrel 14 (shown in FIG. 2) having predefined dimensions is selected and covered by a bladder (not shown). The bladder may be formed, for example, from latex, rubber or silicone. The plies 10a and 10b (i.e., the plies including the thermoplastic resin) are then wrapped around the bladder-covered mandrel 14 in a predetermined manner, and pre-cured. Thereafter, the ply of adhesive 12 may be wrapped over the pre-cured layers of thermoplastic pre-preg, and the ply 10c (or plies, if desired) of thermoset pre-preg may be wrapped over the adhesive 12. After the various plies 10a–c and 12 are wrapped around the mandrel 14 in the prescribed manner, a cellophane or polypropylene tape (or other shrink wrapping material) may be wrapped around the outermost layer of pre-preg, and the wrapped mandrel assembly may be placed in a mold and heated for a time sufficient to allow the plies of pre-preg comprising the golf club shaft to fully cure. Following this process, the part may be removed from the mold, the shrink-wrapping material may be removed from the part, and the exterior surface of the part may be sanded and finished to specification.

Those skilled in the art will appreciate that, depending upon the type of resin used, oven temperatures may range from 250° to 800° F., the requisite curing time may range from a few minutes (for example, in the case of "quick cure" epoxy or thermoplastic resins) to 1.5 hours, and the pressure applied via the latex bladder may range from 0 psi (for some thermoplastic resins) to 300 psi. Thus, during the pre-curing phase the oven temperature will be set to that applicable to the plies to be pre-cured, and during the final curing stage, the oven will be set to the temperature applicable to the uncured plies.

Alternatively, one or more plies of pre-preg including a thermoset resin may be wrapped around a first mandrel and pre-cured to form a shell structure. Thereafter, the mandrel may be removed, and a plurality of plies of pre-preg including a thermoplastic resin may be wrapped around a second, bladder covered mandrel, a layer of adhesive may be wrapped over the plies of thermoplastic pre-preg, and the plies of thermoplastic pre-preg and adhesive may be inserted into the shell formed by the ply (or plies) of thermoset pre-preg. Finally, the wrapped mandrel and shell assembly may be placed in a mold, the bladder may be inflated to a predetermined pressure, and the mold may be heated to a predetermined temperature and for a time sufficient to allow curing of all of the plies of pre-preg comprising the golf club shaft.

As explained above, the ply/plies of pre-preg including the thermoset resin is/are preferably oriented at +/−45°, and the ply/plies of pre-preg including the thermoplastic resin is/are oriented at 0°. However, those skilled in the art will appreciate that, depending upon the design characteristics desired for a particular shaft, additional layers of fiber or pre-preg may be utilized, and the orientation of the layers of fiber or pre-preg may be varied.

Finally, it will be appreciated that filament winding processes also may be utilized to produce golf club shafts in accordance with the present invention. In such embodiments, it may be desirable to filament wind strands of nylon with graphite reinforced thermoplastic pre-preg onto a mandrel in a +/−45° orientation, and to pre-cure the resulting structure. Thereafter, a layer of adhesive may be wrapped over the pre-cured fiber layer, and one or more plies of pre-preg staged within a thermoset resin may be wrapped over the adhesive layer. Preferably, the plies of thermoset pre-preg are aligned in a 0° orientation. Finally, the wrapped mandrel assembly may be wrapped with a cellophane or polypropylene tape, placed in a mold, and heated to a predetermined temperature for a time sufficient to allow the various layers of composite to fully cure.

Figure 3:
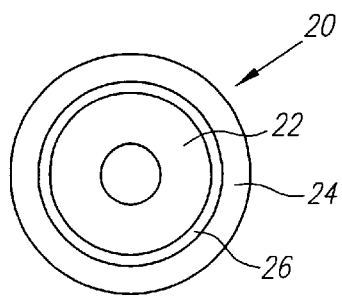
FIG. 3 is an illustration of a cross-section of a wall of a golf club shaft in accordance with a preferred form of the present invention.
Figure 4:
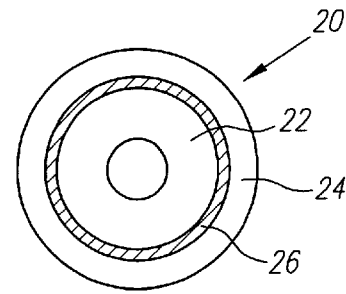
FIG. 4 is an illustration of a wall of a golf club shaft in accordance with an alternative embodiment of the present invention.

Turning now to FIG. 3, a golf club shaft in accordance with a preferred form of the present invention will have a shaft wall structure 20 including a plurality of layers 22 comprising composite fiber fixed within a first thermoplastic resin binding matrix, one or more layers 24 of composite fiber fixed within a second thermoset binding matrix and at least one layer 26 comprising an adhesive, wherein the adhesive upon curing provides a bond between the layers of composite fixed within the thermoplastic and thermoset binding matrices. Further, those skilled in the art will appreciate that, while it is presently preferred that the layer(s) of composite including the thermoset binding matrix encase or surround the layers of composite including the thermoplastic binding matrix, the order of the layers may readily be reversed, as shown in FIG. 4. Finally, it should be understood that the methods of the present invention may be utilized to form sections of a golf club shaft and that neither the thermoset nor thermoplastic layers of composite need necessarily extend along the entire length of the golf club shaft.

While the invention is susceptible to various modifications and alternative forms, specific examples thereof have been shown by way of example in the drawings and are herein described in detail. It should be understood, however, that the invention is not to be limited to the particular forms or methods disclosed, but to the contrary, the invention is to cover all modifications, equivalents, and alternatives falling within the spirit and scope of the appended claims.

What is claimed is:

1. A thermoplastic/thermoset hybrid golf club shaft comprising:

a first layer of composite fiber bound within a thermoplastic resin, a second layer of composite fiber bound within a thermoset resin, and an adhesive disposed between said first and second layers of composite fiber, said first and second layers of composite fiber and said adhesive being co-cured to form a multi-layer bonded shaft structure wherein said adhesive comprises a high peel strength nylon epoxy film.

2. The thermoplastic/thermoset hybrid golf club shaft of claim 1, wherein said first layer is internally disposed with respect to said second layer within said golf club shaft.

3. The thermoplastic/thermoset hybrid golf club shaft of claim 1, wherein said first layer is externally disposed with respect to said second layer within said golf club shaft.

4. A thermoplastic/thermoset hybrid golf club shaft comprising:

one or more layers of composite fiber bound within a thermoplastic resin, one or more layers of composite fiber bound within a thermoset resin, and an adhesive disposed between said one or more layers of composite fiber bound within said thermoplastic resin and said one or more layers of composite fiber bound within said thermoset resin, wherein said adhesive comprises a high peel strength nylon epoxy film, said layers of composite fiber and said adhesive being co-cured to form a multi-layer bonded shaft structure.

5. The thermoplastic/thermoset hybrid golf club shaft of claim 4, wherein said one or more layers of composite fiber bound within said thermoplastic resin are internally disposed with respect to said one or more layers of composite fiber bound within said thermoset resin within said golf club shaft.

6. The thermoplastic/thermoset hybrid golf club shaft of claim 4, wherein said one or more layers of composite fiber bound within said thermoplastic resin are externally disposed with respect to said one or more layers of composite fiber bound within said thermoset resin within said golf club shaft.

7. A thermoplastic/thermoset hybrid golf club shaft comprising:
   one or more layers of composite fiber bound within a thermoset resin,
   one or more layers of composite fiber bound within a thermoplastic resin, said one or more layers of composite fiber bound within said thermoplastic resin surrounding said one or more layers of fiber bound within said thermoset resin, and
   a high peel strength nylon epoxy film adhesive disposed between and coupling at least one layer of composite fiber bound within said thermoset resin and at least one layer of composite fiber bound within said thermoplastic resin.

8. A thermoplastic/thermoset hybrid golf club shaft comprising:
   a first layer of composite fiber bound within a thermoset resin,
   a second layer of composite fiber bound within a thermoplastic resin, said second layer of composite fiber surrounding said first layer of composite fiber, and
   a high peel strength nylon epoxy film adhesive disposed between and coupling said first layer of composite fiber and said second layer of composite fiber.

9. A golf club shaft comprising:
   a first layer composed of composite fiber bound within a thermoplastic resin;
   a second layer composed of composite fiber bound within a thermoset resin; and
   an adhesive layer disposed between said first and second layers of composite fiber, said adhesive layer composed of a material capable of chemically adhering to the thermoplastic resin and the thermoset resin, said adhesive layer composed of a material different than a material of said first layer and said second layer, and said material of said adhesive layer homogeneous in composition throughout the entire adhesive layer;
   whereby the golf club shaft is capable of withstanding at least 500 high heel hits without delamination of either said first layer or said second layer.

10. The golf club shaft according to claim 9 wherein said composite fiber of the first layer is oriented at zero degrees relative to a longitudinal axis of the golf club shaft and said composite fiber of said second layer is oriented at forty-five degrees relative to a longitudinal axis of the golf club shaft.

* * * * *